UNITED STATES PATENT OFFICE.

WILLIAM SCHROECK, OF PHILADELPHIA, PENNSYLVANIA.

COLLYRIUM.

SPECIFICATION forming part of Letters Patent No. 267,759, dated November 21, 1882.

Application filed August 21, 1882. (No specimens.)

*To all whom it may concern:*

Be it known that I, WILLIAM SCHROECK, a citizen of the United States, residing in the city and county of Philadelphia, State of Pennsylvania, have invented a new and useful Improvement in Eye-Medicine, which improvement is fully set forth in the following specification.

In carrying out my invention I take ginger-root, one dram; camphor, one-half dram; hellebore-root, (*Radix helleborus fœtida*,) one-half dram; pellitory-root, one-half dram; rue, one dram; *Radix lapathi*, of the species *Rumex*, known as "yellow dock-root;" euphrasia, one dram; cloves or clove-buds, one scruple, and grind them together, and to the resultant powder I add one pint of diluted spirits of wine, brandy, or other suitable spirits; but the proportions of the ingredients may be varied as desired. The mass is then exposed to the sun for about fourteen days, after which the liquor is drawn off and bottled, ready for use.

The medicine is serviceable for weak, sore, and diseased eyes, and is rubbed on the eyes or eyelids as occasion requires.

Having thus described my invention, what I claim as new, and desire to secure by Letters Patent, is—

The composition of matter forming eye medicine or water, consisting of ginger-root, camphor, hellebore-root, (*Radix helleborus fœtida*,) pellitory-root, rue, (*Radix lapathi*,) of the species *Rumex*, known as "yellow dock-root," euphrasia, cloves, and spirits, in the proportions stated, substantially as and for the purpose set forth.

WILL. SCHROECK.

Witnesses:
ULRICH KOSTENBADER,
H. E. GARSED.